United States Patent
Goel et al.

(10) Patent No.: US 8,914,580 B2
(45) Date of Patent: Dec. 16, 2014

(54) REDUCING CACHE POWER CONSUMPTION FOR SEQUENTIAL ACCESSES

(75) Inventors: Rajat Goel, Saratoga, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1120 days.

(21) Appl. No.: 12/861,091

(22) Filed: Aug. 23, 2010

(65) Prior Publication Data

US 2012/0047329 A1 Feb. 23, 2012

(51) Int. Cl.
*G06F 12/08* (2006.01)
(52) U.S. Cl.
CPC ........ *G06F 12/0882* (2013.01); *G06F 12/0888* (2013.01); *G06F 2212/1028* (2013.01); *Y02B 60/1225* (2013.01)
USPC ...... 711/125; 711/128; 711/169; 711/E12.02; 711/E12.018
(58) Field of Classification Search
CPC ............ G06F 12/0879; G06F 12/0882; G06F 12/0877
USPC .................. 711/128, 169, 167, 125, E12.018, 711/E12.02
See application file for complete search history.

(56) References Cited

U.S. PATENT DOCUMENTS

| | | | |
|---|---|---|---|
| 5,499,355 A | 3/1996 | Krishnamohan et al. | |
| 6,560,679 B2 | 5/2003 | Choi et al. | |
| 6,944,714 B2* | 9/2005 | Lesarte et al. | 711/128 |
| 6,983,346 B2 | 1/2006 | Zhang | |
| 7,143,243 B2 | 11/2006 | Miller | |
| 7,360,023 B2* | 4/2008 | Goodrich | 711/128 |
| 7,430,642 B2* | 9/2008 | Moyer | 711/141 |
| 7,472,224 B1* | 12/2008 | Klass et al. | 711/119 |
| 7,752,410 B1* | 7/2010 | Shin et al. | 711/167 |
| 7,761,665 B2* | 7/2010 | Grandou et al. | 711/128 |
| 7,979,622 B2* | 7/2011 | Okamoto | 711/157 |
| 8,327,126 B2* | 12/2012 | Bell et al. | 713/100 |
| 2008/0040546 A1* | 2/2008 | Vasekin et al. | 711/128 |
| 2008/0082753 A1 | 4/2008 | Licht et al. | |
| 2009/0031082 A1* | 1/2009 | Ford et al. | 711/128 |

* cited by examiner

*Primary Examiner* — Pierre-Michel Bataille
(74) *Attorney, Agent, or Firm* — Anthony M. Petro; Meyertons, Hood, Kivlin, Kowert & Goetzel, P.C.

(57) ABSTRACT

In some embodiments, a cache may include a tag array and a data array, as well as circuitry that detects whether accesses to the cache are sequential (e.g., occupying the same cache line). For example, a cache may include a tag array and a data array that stores data, such as multiple bundles of instructions per cache line. During operation, it may be determined that successive cache requests are sequential and do not cross a cache line boundary. Responsively, various cache operations may be inhibited to conserve power. For example, access to the tag array and/or data array, or portions thereof, may be inhibited.

19 Claims, 7 Drawing Sheets

REDUCING CACHE POWER CONSUMPTION FOR SEQUENTIAL ACCESSES

BACKGROUND

1. Field of the Invention

This invention is related to the field of power management in processors, and more particularly to power management of cache arrays and similar structures.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

In an integrated circuit that includes one or more processors, power management is balanced with the need for high processor performance. To improve performance, the processor often implements caches and/or other similar data structures that provide rapid access to instructions or data that would otherwise require a significantly longer time to obtain (e.g., from an external memory). However, accessing a cache often involves multiple tag value comparisons, word-line discharges, and/or other circuit operations that can consume significant amounts of power.

SUMMARY

In some embodiments, a cache may include a tag array and a data array, as well as circuitry that detects whether accesses to the cache are sequential (e.g., occupying the same cache line). For example, an instruction cache may include a tag array and a data array that stores multiple bundles of instructions per cache line. During operation, an instruction fetch unit may cause the bundles to be fetched, and may detect that successive fetch requests are sequential and do not cross a cache line boundary. In particular, the instruction fetch unit may determine that a particular fetch request does not cross a cache line boundary without comparing an address of the particular fetch request with an address of an earlier fetch request.

In response to determining that a fetch request is sequential and does not cross a cache line boundary, the requested bundle may be retrieved from the data array while access to the tag array is inhibited (e.g., the tag array may remain in a powered-down state).

In some implementations, the data array may be implemented by a number of independently-controllable banks, where within a particular cache line, different bundles are stored in different banks. In one such implementation, the requested bundle may be retrieved from a corresponding bank while access to the remaining banks of the data array is inhibited.

In an embodiment, a cache circuit may be configured such that in the event of sequential cache accesses, a tag array may be accessed to retrieve a tag, while during tag retrieval, a data array is inhibited such that no data is read from the data array. In another embodiment, a cache circuit may be configured such that in the event of sequential cache accesses, access to a tag array may be inhibited without inhibiting operation of a tag comparator.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Processor Overview

Figure 1:
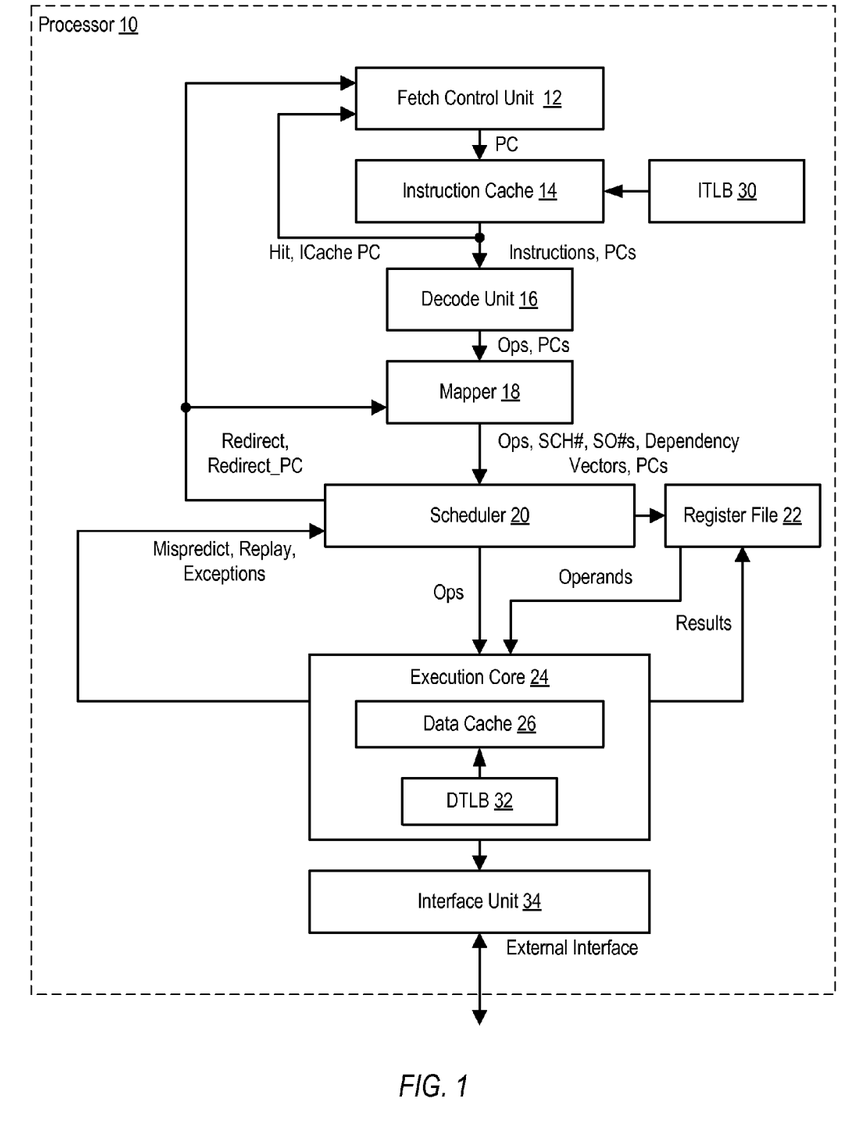
FIG. 1 is a block diagram of an embodiment of a processor.

Turning now to FIG. 1, a block diagram of an embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an ICache PC to the fetch control unit 12. The mapper 18 is coupled to provide ops, a scheduler number (SCH#), source operand numbers (SO#s), one or more dependency vectors, and PCs to the scheduler 20. The scheduler 20 is coupled to receive replay, mispredict, and exception indications from the execution core 24, is coupled to provide a redirect indication and redirect PC to the fetch control unit 12 and the mapper 18, is coupled to the register file 22, and is coupled to provide ops for execution to the execution core 24. The register file is coupled to provide operands to the execution core 24, and is coupled to receive results to be written to the register file 22 from the execution core 24. The execution core 24 is coupled to the interface unit 34, which is further coupled to an external interface of the processor 10.

Fetch control unit 12 may be configured to generate fetch PCs for instruction cache 14. In some embodiments, fetch control unit 12 may include one or more types of branch predictors. For example, fetch control unit 12 may include indirect branch target predictors configured to predict the target address for indirect branch instructions, conditional branch predictors configured to predict the outcome of conditional branches, and/or any other suitable type of branch predictor. During operation, fetch control unit 12 may generate a fetch PC based on the output of a selected branch predictor. If the prediction later turns out to be incorrect, fetch control unit 12 may be redirected to fetch from a different address. When generating a fetch PC, in the absence of a nonsequential branch target (i.e., a branch or other redirection to a nonsequential address, whether speculative or non-speculative), fetch control unit 12 may generate a fetch PC as a sequential function of a current PC value. For example, depending on how many bytes are fetched from instruction cache 14 at a given time, fetch control unit 12 may generate a sequential fetch PC by adding a known offset to a current PC value.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in an embodiment. Other embodiments may use larger or smaller cache line sizes. In response to a given PC from the fetch control unit 12, the instruction cache 14 may output up to a maximum number of instructions. It is contemplated that processor 10 may implement any suitable instruction set architecture (ISA), such as, e.g., the ARM™, PowerPC™, or x86 ISAs, or combinations thereof.

In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 14 may use virtual address bits for cache indexing and physical address bits for cache tags.

In order to avoid the cost of performing a full memory translation when performing a cache access, processor 10 may store a set of recent and/or frequently-used virtual-to-physical address translations in a translation lookaside buffer (TLB), such as Instruction TLB (ITLB) 30. During operation, ITLB 30 (which may be implemented as a cache, as a content addressable memory (CAM), or using any other suitable circuit structure) may receive virtual address information and determine whether a valid translation is present. If so, ITLB 30 may provide the corresponding physical address bits to instruction cache 14. If not, ITLB 30 may cause the translation to be determined, for example by raising a virtual memory exception.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In an embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 24. When an op is scheduled, the scheduler 20 may be configured to read its source operands from the register file 22 and the source operands may be provided to the execution core 24. The execution core 24 may be configured to return the results of ops that update registers to the register file 22. In some cases, the execution core 24 may forward a result that is to be written to the register file 22 in place of the value read from the register file 22 (e.g. in the case of back to back scheduling of dependent ops).

The execution core 24 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 24 may be configured to execute predicted branch ops, and may receive the predicted target address that was originally provided to the fetch control unit 12. The execution core 24 may be configured to calculate the target address from the operands of the branch op, and to compare the calculated target address to the predicted target address to detect correct prediction or misprediction. The execution core 24 may also evaluate any other prediction made with respect to the branch op, such as a prediction of the branch op's direction. If a misprediction is detected, execution core 24 may signal that fetch control unit 12 should be redirected to the correct fetch target. Other units, such as the scheduler 20, the mapper 18, and the decode unit 16 may flush pending ops/instructions from the speculative instruction stream that are subsequent to or dependent upon the mispredicted branch.

The execution core may include a data cache 26, which may be a cache memory for storing data to be processed by the processor 10. Like the instruction cache 14, the data cache 26 may have any suitable capacity, construction, or line size (e.g. direct mapped, set associative, fully associative, etc.). Moreover, the data cache 26 may differ from the instruction cache 14 in any of these details. As with instruction cache 14, in some embodiments, data cache 26 may be partially or entirely addressed using physical address bits. Correspondingly, a data TLB (DTLB) 32 may be provided to cache virtual-to-physical address translations for use in accessing the data cache 26 in a manner similar to that described above with respect to ITLB 30. It is noted that although ITLB 30 and DTLB 32 may perform similar functions, in various embodiments they may be implemented differently. For example, they may store different numbers of translations and/or different translation information.

The register file 22 may generally include any set of registers usable to store operands and results of ops executed in the processor 10. In some embodiments, the register file 22 may include a set of physical registers and the mapper 18 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may include an architected register set containing the committed state of the logical registers and a speculative register set containing speculative register state.

The interface unit 24 may generally include the circuitry for interfacing the processor 10 to other devices on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. In various embodiments, the processor 10 may implement any instruction set architecture.

Cache Overview

Figure 2:
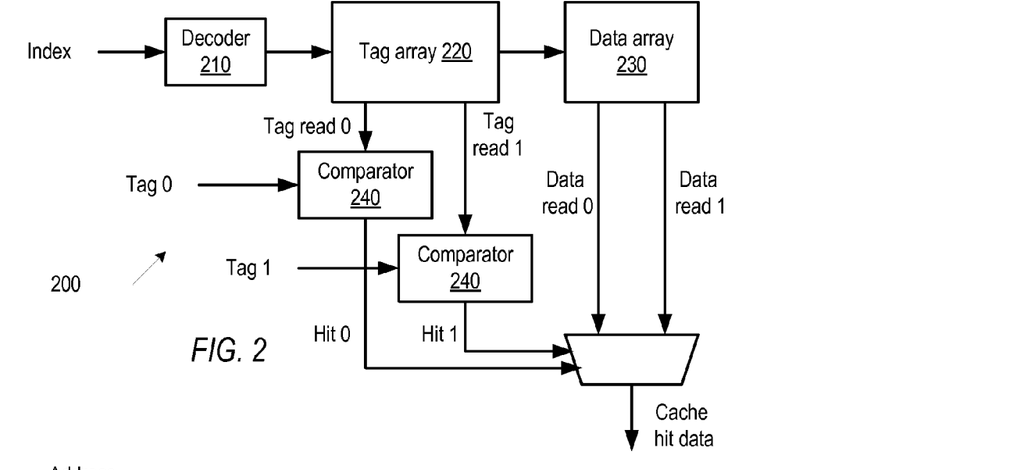
FIG. 2 is a block diagram illustrating the general organization of a cache, according to an embodiment.

FIG. 2 illustrates how a cache might be generally organized according to one of a number of implementations. In various embodiments, cache 200 or a suitable variant thereof may represent functionality that may be included in any of instruction cache 14, data cache 26, ITLB 30, DTLB 32, or other data storage circuits that may be found within processor 10, including lower-level caches not shown in FIG. 1, such as L2 or L3 caches. It is noted that state elements such as latches, registers, sense amplifiers, or the like are deliberately omitted from FIG. 2 in order not to obscure the general data flow that may occur within cache 200. As discussed in greater detail below with respect to FIGS. 3-10, in various embodiments, state elements may be placed in a variety of locations within cache 200.

In the illustrated embodiment, cache 200 includes a decoder 210 coupled to receive an index input and to drive a tag array 220 and a data array 230. Tag array outputs two resultant tag values denoted "tag read 0" and "tag read 1," each of which is coupled to a respective comparator 240. Comparators 240 are respectively coupled to receive tag inputs denoted "tag 0" and "tag 1" and to produce respective output signals "hit 0" and "hit 1." Data array 230 receives the decoded index input from decoder 210 and provides outputs "data read 0" and "data read 1," one of which is selected by the hit signals to generate the output "cache hit data."

Tag array 220 and data array 230 may be implemented according to any suitable circuit design. For example, these arrays may be implemented as static RAM arrays or using any other type of memory technology. The configuration of tag array 220 and data array 230 may depend on the particular cache geometry chosen for cache 200. For example, tag array 220 may be configured to a certain number of tag entries, while data array 230 may be configured to store a corresponding number of cache lines each containing some number of bytes. However, depending on implementation needs, either array may be implemented using banks, sub-banks, or other physical organizations that may not be apparent from the logical organization shown in FIG. 2.

Generally speaking, the index and tag inputs to cache 200 may correspond to portions of the memory address to be read from cache 200. For example, if tag array 220 and data array 230 are implemented as 64-entry arrays, six bits of the memory address may be used to select a particular one of the 64 entries to be read on a particular occasion. For example, decoder 210 may be configured to decode six bits of the input memory address in order to assert one of 64 distinct word lines, each of which selects a particular entry of tag array 220 and data array 230 to be output from the array. It is noted that in various embodiments, the index bits may be selected from either a virtual or physical address or a combination of both, and need not represent contiguous bits of the address. Of course, the number of index bits employed may vary according to the actual organization of cache 200 (e.g., according to whether more or fewer entries are implemented).

Once an entry has been selected from tag array 220, the tag portion of the input memory address may be compared against the tag value(s) read out of the selected entry to determine whether a cache hit exists. For example, those memory address bits that are not used to index cache 200 or to select a portion of a cache line read from data array 230 may be used as tag bits. As with index bits, tag bits may be selected from either a virtual or physical address or a combination of both, and need not represent contiguous bits of the address. Comparators 240 may be configured to perform the tag comparison and may be implemented according to any suitable approach, such as by using a content-addressable memory (CAM) compare circuit or any other circuit capable of comparing two values to determine their equivalence.

Although only a single instance of tag array 220 and data array 230 are shown, in some embodiments cache 200 may include multiple instances of these arrays. For example, cache 200 may be configured as an N-way set-associative cache that includes N instances of tag array 220 and data array 230. Set-associative caches may be implemented such that for a given tag value and index value, at most one of the N ways hits (i.e., contains an tag entry matching the tag value) with respect to the given tag and index. Each of the N tag arrays 220 may be accessed in parallel and its output compared with the given tag value, and if there is a match, the output of the corresponding data array 230 may be chosen as the result of the cache read.

In some embodiments, cache 200 may be multi-ported. For example, as shown in FIG. 2, cache 200 may be capable of concurrently comparing two distinct tag values (i.e., corresponding to two distinct memory addresses), which may enable cache 200 to concurrently output results for multiple reads, increasing overall cache bandwidth. Various embodiments may impose restrictions on the types of accesses that may be processed concurrently. For example, in some embodiments, concurrent reads must be located within the same cache index, while in others, concurrent reads must be located within different cache indexes or (in multi-banked embodiments) different banks.

Likewise, in some embodiments, cache 200 may be multi-banked with respect to either or both of tag array 220 and data array 230. For example, instead of including a single tag array 220 that includes N entries, cache 200 may divide tag array 210 into M banks each including N/M entries. Such an embodiment may, for example, decrease the complexity of decoder 210 by decreasing the number of unique word lines to be generated (although if multiple decoders are not used, this technique may increase word line loading by increasing the number of banks driven by decoder 210). The individual banks may be accessed concurrently to select a particular entry, and the remaining memory address index bits not used to select the particular entry may be used to select a particular one of the banks. For example, instead of using six index bits to address a single 64-entry bank, tag array 220 may be split into two 32-entry banks. Five of the original index bits may be used to select an entry from each of the two banks, and the sixth index bit may select a particular one of the banks. Numerous other banked configurations are possible and contemplated. Moreover, it is noted that tag array 220 and data array 230 may be implemented using different configurations of banks.

Power Management for Sequential Cache Accesses

As noted above, in some embodiments, a particular entry of tag array 220 corresponds to particular entry of data array 230. For example, an individual tag entry, if matched by the tag field of the requested memory address, will cause a corresponding entry (which may also be referred to as a cache line) of data array 230 to be selected. However, it may frequently be the case that the cache line size of data array 230 is greater than the amount of data to be retrieved from cache 200. For example, it may be desired to read up to, say, 16 bytes at a time out of instruction cache 12 or data cache 26. However, data array 230 may be implemented with a cache line size of 32 bytes, 64 bytes, or some other cache line size that is larger than the maximum amount of data that will be returned for a cache access.

If cache 200 is being accessed sequentially, then it may be the case that a single cache line will contain data sufficient to satisfy multiple successive accesses. For example, in the absence of branch instructions, instructions are often fetched in increasing sequential order. In the case of a 16 byte fetch and a 64 byte instruction cache line, sequential fetching may result in as many as four successive accesses to the same line of data array 230. Similar cache access behavior may occur with respect to a data cache, for example when data arrays or similar data structures are being progressively or iteratively processed.

In the event of multiple sequential accesses to the same cache line, by definition, the index and tag fields of the memory addresses for the sequential accesses will be the same. Thus, in processing these sequential accesses, cache 200 may repeatedly read the same tag value out of tag array 220, perform the same comparison with the tag field of the input address, and select the same cache line from data array 230. However, each of these operations consumes power. Because these operations are largely redundant in the case of sequential operations, the consumed power is effectively wasted. If some of these access operations can be eliminated during sequential accesses, the power consumption of processor 10 may be reduced.

Figure 3:
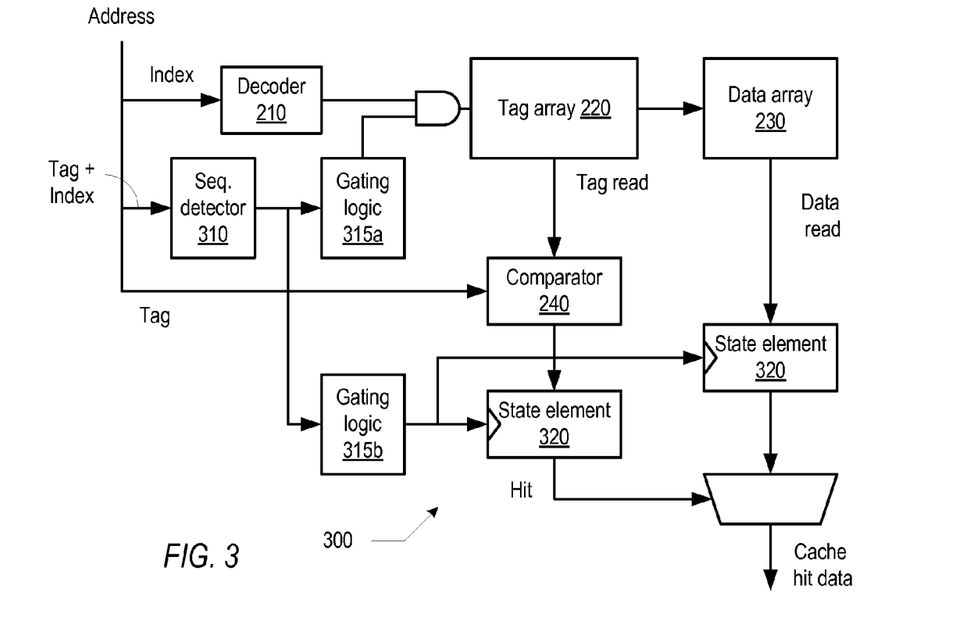
FIG. 3 is a block diagram of an embodiment of a cache in which certain circuit operations may be disabled in the event of sequential accesses.

FIG. 3 illustrates an embodiment of a cache 300 in which certain circuit operations may be disabled in the event of sequential accesses. In the illustrated embodiment, cache 300 is similar to cache 200 of FIG. 2, but includes several additional components: a sequential access detector 310 is coupled to receive the tag and index fields of a requested memory address and to drive gating logic 315a-b. Gating logic 315a is combined with the output of decoder 210 to drive tag array 220 and data array 230. Gating logic 315b is coupled to control a pair of state elements 320 coupled to the outputs of comparator 240 and data array 230, respectively.

For simplicity of illustration, only a single instance of tag array 220 and data array 230 are shown, each having a single read port. However, it is contemplated that in various embodiments, cache 300 may include any suitable number of tag arrays 220 and data arrays 230 (e.g., N instances for an N-way set-associative cache). Similarly, tag arrays 220 and/or data arrays 230 may be implemented with multiple ports and/or multiple banks as described above with respect to FIG. 2. Additionally, though omitted for simplicity of illustration, cache 300 may include one or more ports and associated logic that provide a write path for data storage.

Figure 4:
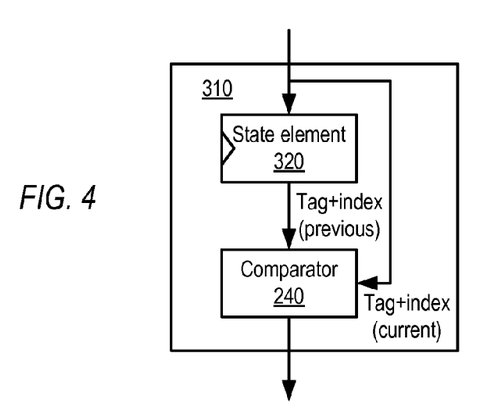
FIG. 4 is a block diagram illustrating an embodiment of a sequential access detector.

Sequential access detector 310 may generally be configured to determine whether a current cache access is sequential with respect to a prior cache access, such as the immediately preceding cache access. An example embodiment of sequential access detector 310 is shown in FIG. 4. In the illustrated embodiment, detector 310 includes a state element 320 that is coupled to receive and store address information, such as the tag and index fields corresponding to a cache access. The output of state element 320 is coupled to a comparator 240, which is also coupled to receive the address information provided to state element 320.

Generally speaking, state element 320 may be any type of circuit element that is capable of receiving and persistently storing a data value. For example, state element 320 may correspond to a latch, a register, a memory element such as a static, dynamic, or nonvolatile RAM, or any other suitable structure. In some embodiments, state element 320 may be operable to store a new value (i.e., to overwrite an existing value) only when activated to do so by a control input, such as an enable, clock signal, or the like. State element 320 may thus be referred to as "controllably storing" data, in that whether storing occurs is subject to a control input.

State element 320 may variously be implemented using dynamic or static circuit techniques, and in some embodiments may be configured to convert dynamic to static signals or vice versa. For example, when coupled to the output of a memory array such as tag array 220, state element 320 may include sense amplifiers or other logic configured to receive differential or low-voltage signals generated by the memory array and convert these signals to the levels needed to drive static logic. It is noted that the different instances of state element 320 that are shown in the drawings may be functionally similar but need not be structurally identical. For example, depending on implementation objectives, one instance of state element 320 may be implemented as a latch, another as a register, and so forth.

In the illustrated embodiment of detector 310, comparator 240 may be configured to compare the value of the address information stored in state element 320 with the value of the address information currently received by comparator 240 to determine whether the two values are the same. For example, comparator 240 may be implemented using combinatorial logic (e.g., using an array of XNOR gates or their logical equivalent), a CAM comparison circuit, or any other suitable circuit for determining whether two values are identical. As shown in FIG. 4, comparator 240 may compare both the tag and index values of the previous and current accesses to determine whether the two accesses are sequential, though as discussed below, in other embodiments different sets of data may be compared.

In some embodiments, a new data value may be stored in state element 320 only when a new cache access is received by cache 300. Such accesses may be separated in time by an arbitrary number of clock cycles. However, it is noted that successive accesses may be considered sequential on the basis of their address information regardless of the amount of time that separates them. That is, detector 310 may be configured to determine whether a current access is sequential with respect to an immediately prior access, regardless of how long ago the prior access occurred. Thus, for example, a first access may occur, and then processor 10 may stall for some number of cycles, after which a second access occurs. State element 320 may preserve information about the first access during the stall period, and if it is directed to the same cache line as the first access, the second access may be treated as a sequential access regardless of exactly when it occurs.

Returning to FIG. 3, in the illustrated embodiment, detector 310 drives gating logic 315a-b. Generally speaking, gating logic 315a-b may include clock gating logic or any other logic that may be needed to synchronize the output of detector 310 or otherwise render the output of detector 310 suitable to control or disable downstream logic. For example, different portions of the downstream logic to be controlled may be controlled by different clocks or may otherwise have different timing or control requirements that necessitate some type of conditioning of the output of detector 310. It is noted that two instances of gating logic 315a-b are shown merely to illustrate the possibility of different types of such conditioning. Depending on the chosen implementation, gating logic 315a-b may be combined into each other or into other circuit elements, or possibly omitted.

It is noted that as used herein, the terms "disable," "inhibit," "deactivate," "de-power," and "quiesce," as well as their grammatical variations, may be used interchangeably to describe any actions that may be taken with respect to an electronic circuit (such as a storage array, bank, decoder, state element, combinatorial logic, or any other type of circuit that may be used in processor 10) that cause the electronic circuit to consume less power than it would consume in a normal or active operating state. In some instances, disabling, inhibiting, deactivating, de-powering, quiescing, or performing similar actions with respect to a circuit may result in the circuit being completely deactivated in a functional sense (e.g., not capable of performing any other operation until it is returned to its normal operating state). For example, actions such as clock gating or disabling a circuit's power supply may cause the circuit to consume less power and also render it functionally inoperable.

However, in some embodiments, disabling, inhibiting, deactivating, de-powering, quiescing, or performing similar actions with respect to a circuit need not result in the circuit becoming completely inoperable in a functional sense. For example, an electronic circuit may be implemented with selectable power conservation modes such that in a lower-power mode, the circuit may operate at a lower clock rate or a lower rate of data throughput, or may deactivate some functionality while maintaining access to other functionality. In such embodiments, the circuit may continue to operate with reduced functionality or capability in the lower-power mode, but still may be referred to as being disabled, inhibited, deactivated, etc. at least in a partial sense.

Figure 5:
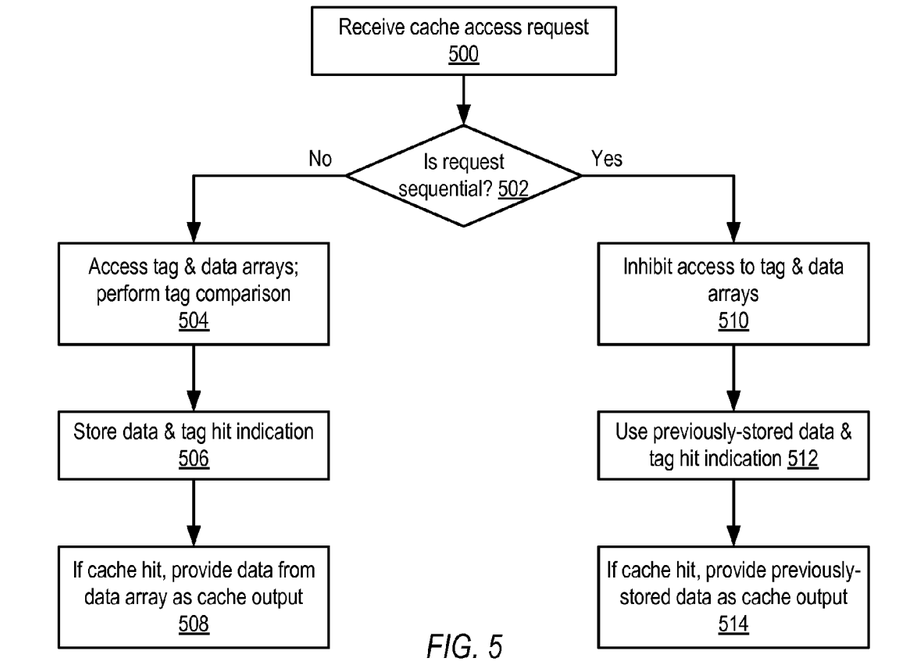
FIG. 5 is a flow chart illustrating operation of an embodiment of a cache.

FIG. 5 illustrates an embodiment of a method of operation of cache 300. In the illustrated embodiment, operation begins at 500 where a cache access request is received. For example, such a request might correspond to a fetch request to instruction cache 14, a load instruction being processed by data cache 26, a TLB lookup request being processed by ITLB 30 or DTLB 32, or another suitable type of request.

Upon receiving the request, at 502, it is determined whether the request is sequential with respect to the previous request. For example, detector 310 may compare address information from the current request with stored address information corresponding to the immediately preceding request, as described above. For the configuration of cache 300 shown in FIG. 3, two successive requests may be determined to be sequential if they share the same tag and index values.

If the received request is not a sequential request, the tag and data arrays are accessed and a tag comparison is performed at 504. For example, in response to detector 310 indicating that the currently received request is not sequential (e.g., by outputting a logic '0'), gating logic 315a may allow the output of decoder 210 to drive a lookup of tag array 220 and data array 230. Once the tag value is obtained, comparator 240 may compare the tag value from tag array 220 with the tag value of the request to determine whether a cache hit has occurred, which may be performed in a manner similar to that described above with respect to FIG. 2.

Continuing with the non-sequential case, the data obtained from the data array lookup and the tag hit indication obtained from the tag comparison are stored at 506. For example, in the embodiment of FIG. 3, the outputs of comparator 240 and data array 230 are coupled to respective state elements 320. In response to detector 310 indicating that the currently received request is not sequential, gating logic 315*b* may allow these outputs to be stored within their respective state elements 320, for example by asserting a write enable or driving a clock associated with state elements 320. If a cache hit has occurred, the data obtained from the data array is also provided at the cache output at 508.

If the received request is determined at 502 to be a sequential request, access to the tag and data arrays is inhibited at 510. For example, in response to detector 310 indicating that the currently received request is sequential (e.g., by outputting a logic '1'), gating logic 315*a* may prevent tag array 220 and data array 230 from being activated to perform a lookup operation. In various embodiments, to accomplish this deactivation, gating logic 315*a* may disable decoder 210, gate its word line outputs, disable the clock inputs of tag array 220 and/or data array 230, or any combination of these or other techniques.

Continuing with the sequential case, the previously-stored data obtained from a prior data array lookup and the previously-stored tag hit indication are used instead of the array outputs at 512. For example, in response to detector 310 indicating that the currently received request is sequential, gating logic 315*b* may inhibit state elements 320 from being updated, thus allowing their previously-stored contents to be used. If the previously-stored tag hit indication indicates that a cache hit has occurred, the data previously stored into state element 320 is also provided at the cache output at 514.

With respect to cache 300, it is noted that in the sequential case, data may be provided at the cache output without activating either tag array 220 or data array 230, which may avoid the power consumption associated with accessing those arrays. For example, in the case of four sequential cache accesses each retrieving only one quarter of a cache line, the cache arrays may need to be accessed only once, which may reduce array power consumption by up to 75% (though it is noted that arrays and other elements may still draw power even when in an inactive state).

Although deactivating both the tag and data arrays for sequential accesses may maximize power conservation, in some instances, it may be undesirable to insert additional logic into a critical timing path. For example, in some cache implementations, the speed of a tag access may limit the overall speed at which the entire processor may operate, such that increasing the latency of a tag access (e.g., by inserting additional gates into the tag access timing path) may have far-reaching effects.

Figure 6:
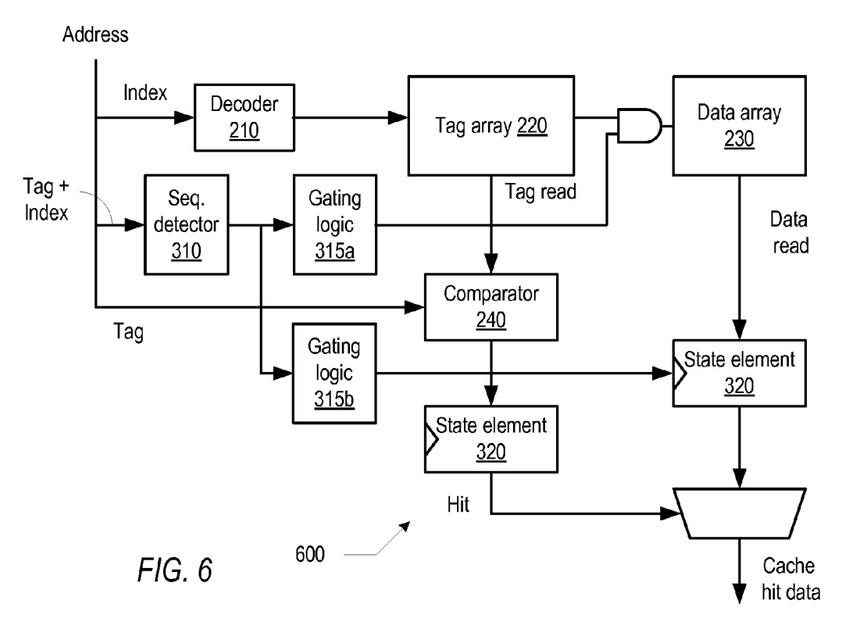
FIG. 6 is a block diagram of another embodiment of a cache in which certain circuit operations may be disabled in the event of sequential accesses.

FIG. 6 illustrates an embodiment of a cache 600 that, like cache 300, also supports disabling certain circuit operations in the event of sequential accesses. However, instead of preventing access to both tag array 220 and data array 230, cache 600 inhibits only data array 230 without adding additional gating logic to the tag path. Correspondingly, cache 600 may represent a balance of sequential access power reduction against timing implications, e.g., when contrasted with cache 300.

In the illustrated embodiment, cache 600 is similar to cache 300 of FIG. 3, except that gating logic 315*a* controls data array 230 without affecting tag array 220, and gating logic 315*b* controls the state element 320 at the output of data array 230 without affecting the state element 320 at the output of comparator 240. (In some embodiments, the state element 320 at the output of comparator 240 may be omitted entirely.)

Figure 7:
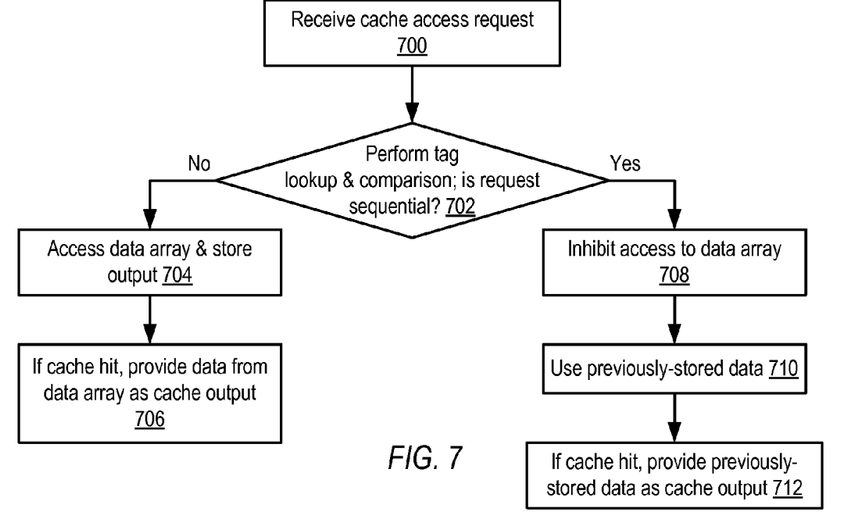
FIG. 7 is a flow chart illustrating operation of another embodiment of a cache.

FIG. 7 illustrates an embodiment of a method of operation of cache 600. In the illustrated embodiment, operation begins at 700 where a cache access request is received. For example, as discussed above with respect to FIG. 5, such a request might correspond to a fetch request to instruction cache 14, a load instruction being processed by data cache 26, a TLB lookup request being processed by ITLB 30 or DTLB 32, or another suitable type of request.

Upon receiving the request, at 702, tag lookup and comparison occurs, and it is concurrently determined whether the request is sequential with respect to the previous request. For example, detector 310 may perform an address comparison similar to that described above with respect to FIGS. 3-5. It is noted that in this embodiment, the tag array access is not dependent upon whether or not a request is sequential. That is, for each request, a tag array lookup may occur, and comparator 240 may evaluate the retrieved tag.

If the received request is not a sequential request, the data array is accessed and its output stored at 704. For example, in response to detector 310 indicating that the currently received request is not sequential, gating logic 315*a* may allow the output of decoder 210 to drive a lookup of data array 230, and gating logic 315*b* may allow the data output to be stored within corresponding state element 320, for example by asserting a write enable or driving a clock associated with state elements 320. If a cache hit has occurred, as determined by the tag lookup and comparison, the data obtained from the data array is also provided at the cache output at 706.

If the received request is determined at 702 to be a sequential request, access to the data array is inhibited at 708. For example, in response to detector 310 indicating that the currently received request is sequential, gating logic 315*a* may prevent data array 230 from being activated to perform a lookup operation. In various embodiments, to accomplish this deactivation, gating logic 315*a* may disable decoder 210, gate its word line outputs, disable the clock input of data array 230, or any combination of these or other techniques. However, as shown in FIG. 6, gating logic 315*a* may perform these operations only with respect to data array 230, while leaving the operation of decoder 210 unaffected with respect to tag array 220. (Alternatively, in some embodiments, cache 600 may implement separate decoders 210 for tag array 220 and data array 230.)

Continuing with the sequential case, the previously-stored data obtained from a prior data array lookup is used instead of the data array output at 710. For example, in response to detector 310 indicating that the currently received request is sequential, gating logic 315*b* may inhibit the state element 320 coupled to data array 230 from being updated, thus allowing its previously-stored contents to be used. If the output of comparator 240 indicates that a cache hit has occurred, the data previously stored into state element 320 is also provided at the cache output at 712.

Figure 8:
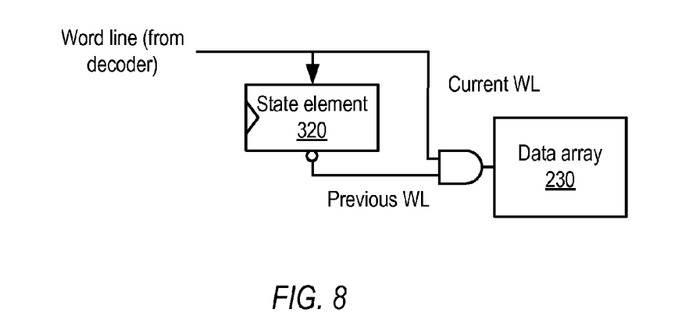
FIG. 8 is a block diagram of a circuit that may be used to deactivate a cache array.

In the previously-discussed embodiments, detector 310 was used to determine whether successive accesses were sequential, based on a comparison of address bits. FIG. 8 illustrates an embodiment of an alternative circuit that may be used to deactivate data array 230 (and/or, in some instances, tag array 220) for sequential accesses. In the embodiment of FIG. 8, instead of comparing address bits, the prior and current state of individual word lines output by decoder 210 may be compared. For example, decode 210 may output individual word lines to select corresponding entries of data array 230. In some embodiments, if the same word line is selected for two successive accesses, then the two accesses are effectively sequential, and there may be no need to access data array 230 because the data to be read is already available (e.g., within state element 320 coupled to data array 230) as a result of a previous access. Correspondingly, when processing a given access, the circuit of FIG. 8 may be configured to compare the current word line value with the word line value for the previous access, which is stored within state element 320. If both values are asserted (e.g., logic '1'), then by virtue of the inverted output of state element 320, the logical AND of the two values will be deasserted (e.g., logic '0'). This causes the word line not to fire for the given access, effectively deactivating data array 230.

Figure 9:
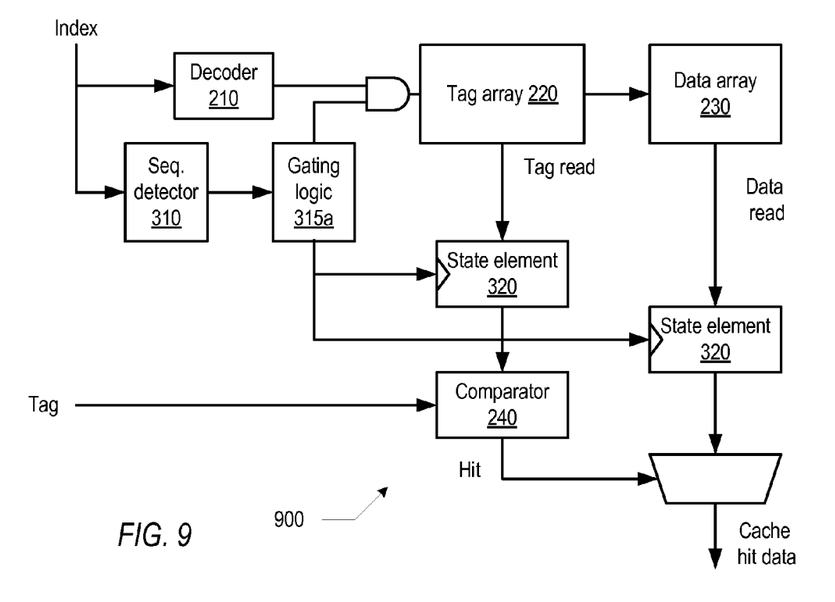
FIG. 9 is a block diagram illustrating another embodiment of a cache in which certain circuit operations may be disabled in the event of sequential accesses.

Cache 900 of FIG. 9 illustrates an alternative configuration of cache 300 of FIG. 3. Specifically, in the tag read path of cache 900, state element 320 is located prior to comparator 240, instead of subsequent to comparator 240 as in cache 300. (For simplicity, only a single instance of gating logic 315a is shown, although cache 900 may alternatively implement gating logic 315a-b in a manner similar to that of cache 300.) Such an arrangement may be useful, e.g., in instances where the tag comparison is more timing-critical than the tag array access. For example, this may arise when translation or other processing needs to be performed to obtain the tag bits of the input address, as with a physically-tagged cache.

During operation, cache 900 may suppress access to tag array 220 and data array 230 in the event of sequential accesses in a manner similar to that discussed above for cache 300. However, because a full tag compare is performed by comparator 240 in cache 900 even in the case of sequential accesses, it may be unnecessary to include the tag bits in determining whether accesses are sequential. Accordingly, in FIG. 9, detector 310 is shown receiving only the index bits of the memory request, in contrast to FIG. 3 where detector 310 receives both index and tag bits. As a consequence of needing to process less information, the implementation of detector 310 may be simpler and faster in cache 900. Moreover, the particular arrangement shown may facilitate power conservation for sequential accesses while reducing the timing impact to the tag-comparison path.

In the various embodiments discussed above, whether or not cache accesses are sequential is determined as a function of comparing address bits (or information derived from address bits, such as word lines) of prior and current accesses. However, in some instances, the presence of sequential accesses may be determined in other manners. For example, when fetching instructions, fetch control logic may explicitly indicate that fetch addresses are being generated in a sequential fashion. Under such circumstances, so long as two successive fetches are known to be directed to the same cache line, it may be possible to identify them as sequential simply by virtue of the fact that the fetch control logic indicates that they are, without requiring an actual comparison of fetch addresses.

Figure 10:
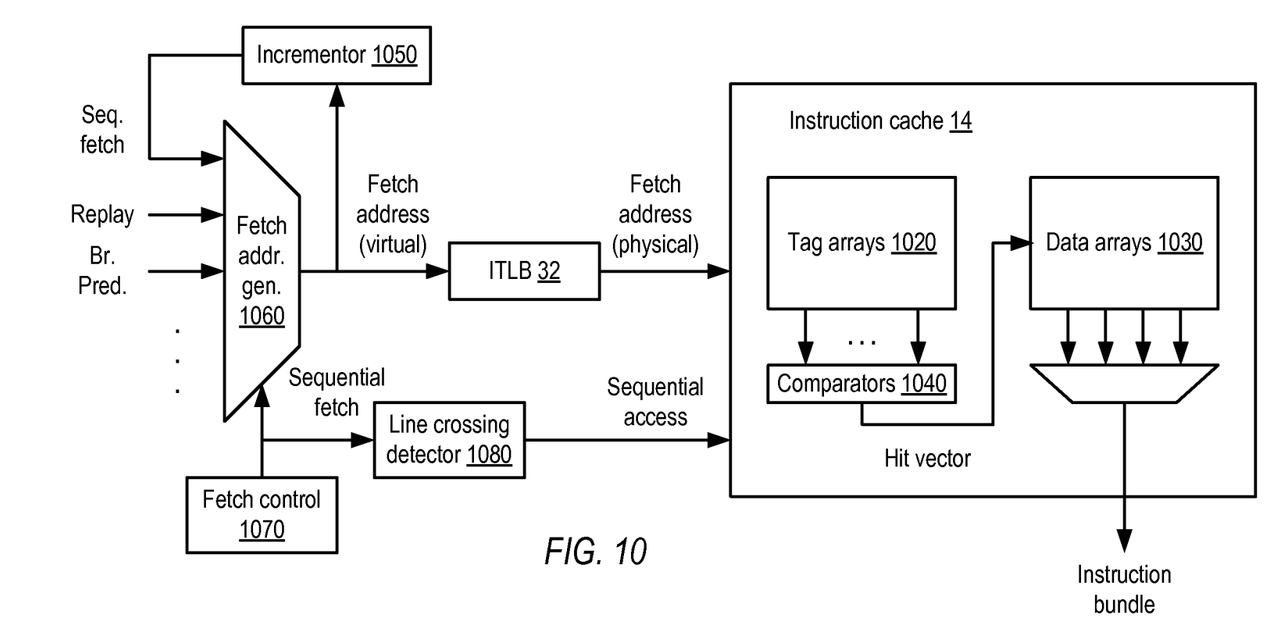
FIG. 10 is a block diagram illustrating an embodiment of fetch address generation logic.

FIG. 10 illustrates an example embodiment of fetch address generation logic that may be configured to operate in the manner just described. In the illustrated embodiment, a fetch address generator 1060 is coupled to fetch control logic 1070 and incrementor 1050, as well as ITLB 32. Fetch control logic 1070 is also coupled to a cache line crossing detector 1080. In turn, ITLB 32 and detector 1080 are coupled to instruction cache 14. In the illustrated embodiment, instruction cache 14 includes tag arrays 1020 and data arrays 1030. Tag arrays 1020 are coupled to a set of comparators 1040, which in turn generate a hit vector that couples to data arrays 1030. Ultimately, data arrays 1030 produce an instruction bundle for further processing by, e.g., decode unit 16 of FIG. 1.

During operation, fetch address generator 1060 selects one of a number of possible fetch address sources under the control of fetch control logic 1070. For example, if a branch is predicted to be taken, the target of the branch may be selected as the address to fetch from. Similarly, if an instruction replay occurs because of, e.g., failed data speculation, instructions may be fetched from the address corresponding to the replayed instruction.

In the absence of selecting an alternative fetch source, fetch control logic 1070 may specify that the next fetch address should be determined sequentially with respect to the previous fetch address. For example, in the illustrated embodiment, incrementor 1050 may be configured to add a specific increment offset value (e.g., the size in bytes of the standard amount of data to be fetched, such as a single instruction or a particular number of instructions) to the current fetch address to generate the next sequential fetch address. If fetch control logic 1070 determines that sequential fetching should occur, the output of incrementor 1050 may be selected by fetch address generator 1060 as the next fetch address. In the illustrated embodiment, the fetch address output from fetch address generator 1060 is a virtual address that may be translated to a physical address by ITLB 32 prior to being provided to instruction cache 14. In other embodiments, some or all bits of the virtual address may be provided to instruction cache 14 without translation.

It is possible that two sequential fetches may not be directed to the same cache line, depending on their alignment. In the illustrated embodiment, line crossing detector 1080 may be configured to determine whether a selected sequential fetch address crosses a cache line boundary. In some embodiments, this determination may be performed without explicitly comparing two different address values (such as a current and prior fetch address). For example, detector 1080 may be configured to examine the output of incrementor 1050 to determine whether a carry in to the least significant bit of the index portion of the fetch address occurred, which may signify that a cache line boundary has been crossed.

Alternatively, detector 1080 may be configured to store the least significant bit of the index portion of the previous fetch address and compare it against the corresponding bit of the current fetch address to determine whether this bit changed value as a result of being incremented. If so, this may also signify that the cache line boundary has been crossed. Other techniques for detecting cache line boundary crossing are possible and contemplated.

If sequential fetching is active and a cache line boundary is crossed, detector 1080 may prevent the sequential access input to instruction cache 14 from being asserted. Conversely, if sequential fetching is active and no cache line boundary is crossed, detector 1080 may assert the sequential access input to instruction cache 14. From the perspective of instruction cache 14, the sequential access input may have the same general effect as the output of sequential access detector 310 discussed above. That is, it may be used to selectively disable access to tag arrays 1020 and/or data arrays 1030, depending on the implementation.

In the illustrated embodiment, instruction cache 14 includes some number of each of tag arrays 1020, data arrays 1030, and comparators 1040. Generally speaking, individual ones of these components may correspond in functionality (and, in some instances, structure) to tag array 220, data array 230, and comparator 240 discussed with respect to the various cache embodiments described above. Although state elements and gating logic are not specifically shown in FIG. 10, it is contemplated that in various embodiments, instruction cache 14 may employ any of the configurations described above with respect to FIGS. 3-9, or suitable variations thereof. Thus, for example, instruction cache 14 may include gating logic driven by the sequential address signal provided by detector 1080 and configured to inhibit access to tag arrays 1020 and/or data arrays 1030 in the event of sequential instruction fetch addresses within the same cache line.

As an example, instruction cache 14 may be organized in such a way that each cache line within data arrays 1030 contains some number of instruction "bundles," each of which contains some number of instructions. (In an embodiment, a 64-byte cache line might accommodate four bundles, each including four 4-byte instructions.) A bundle may represent the amount of data that may generally be fetched from instruction cache 14 during a single fetch operation.

In the event that multiple bundles are sequentially fetched from instruction cache 14, there are several possible configurations for reducing cache power consumption. In one configuration, assuming a cache hit occurs, the entire cache line may be read from data arrays 1030 and stored within a state element in a manner similar to that discussed above. Then, during the successive sequential fetches, particular bundles may be selected in sequence from the stored cache line (e.g., via a multiplexer) and output from instruction cache 14.

In an alternative configuration, data arrays 1030 may be implemented using banks, where each bank corresponds to a particular bundle, and where only the selected bank may be activated for a given fetch operation. In such an embodiment, it may be unnecessary to provide a state element to store the data output from data arrays 1030 during sequential accesses, because the needed bundle may be obtained from its corresponding bank while the remaining banks remain quiescent.

System and Computer Accessible Storage Medium

Figure 11:
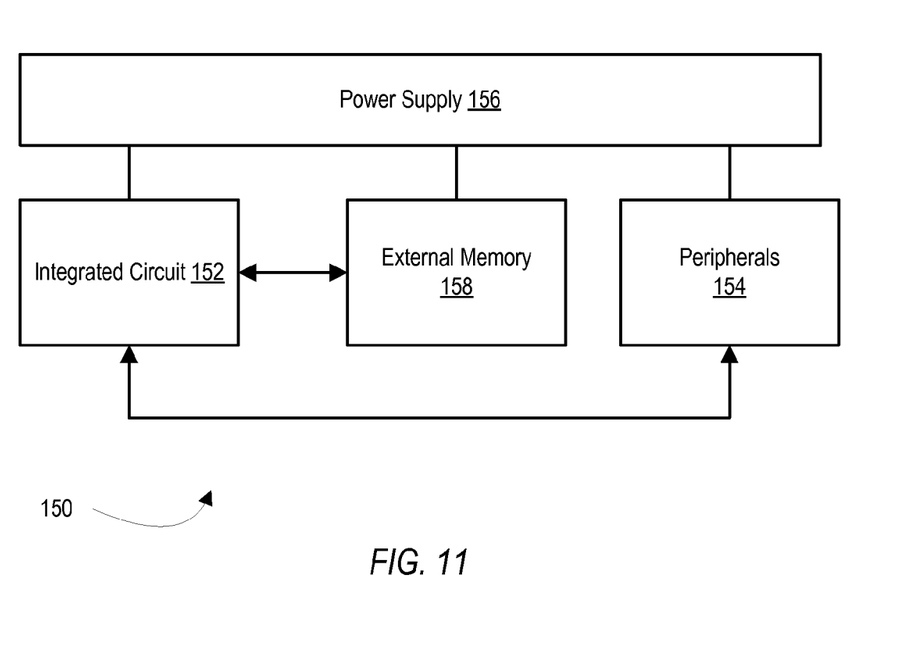
FIG. 11 is a block diagram illustrating an embodiment of a system.

Turning next to FIG. 11, a block diagram of an embodiment of a system 150 is shown. In the illustrated embodiment, the system 150 includes at least one instance of an integrated circuit 152. The integrated circuit 152 may include one or more instances of the processor 10 (from FIG. 1). The integrated 152 may, in an embodiment, be a system on a chip including one or more instances of the processor 10 and various other circuitry such as a memory controller, video and/or audio processing circuitry, on-chip peripherals and/or peripheral interfaces to couple to off-chip peripherals, etc. The integrated circuit 152 is coupled to one or more peripherals 154 and an external memory 158. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The peripherals 154 may include any desired circuitry, depending on the type of system 150. For example, in an embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMM5), etc.

Numerous variations and modifications will become apparent to those skilled in the art once the above disclosure is fully appreciated. It is intended that the following claims be interpreted to embrace all such variations and modifications.

What is claimed is:

1. A method, comprising:
   a cache circuit performing:
   receiving a cache access request;
   in response to receiving the cache access request, retrieving a tag value corresponding to the cache access request from a tag array;
   determining whether the cache access request is sequential with respect to a previous request;
   in response to determining that the cache access request is sequential, inhibiting access to an entire data array during retrieval of the tag value such that no data is read from the entire data array.

2. The method of claim 1, wherein determining whether the cache access request is sequential with respect to the previous request comprises determining whether values of index fields of respective memory addresses associated with the cache access request and the previous request are identical.

3. The method of claim 1, further comprising the cache circuit performing: in response to determining that the cache access request is sequential, retrieving a previously-stored copy of a particular cache line corresponding to the cache access request from a state element that is distinct from the data array.

4. The method of claim 1, wherein the data array includes a plurality of independently-selectable banks arranged such that different portions of a particular cache line are stored in different ones of the banks, wherein the cache access request identifies a given portion of the particular line, and wherein the method further comprises:
   in response to receiving the cache access request, the cache circuit accessing a given one of the banks corresponding to the given portion of the particular line and inhibiting access to banks other than the given bank.

5. A method, comprising:
   a cache circuit performing:
   receiving a cache access request;
   determining whether the cache access request is sequential with respect to a previous request;
   in response to determining that the cache access request is sequential, disabling a tag array and comparing a tag value associated with the cache access request with a tag value previously retrieved from the tag array to determine whether the cache access request results in a cache hit; and
   in response to determining that the cache access request is sequential, retrieving a previously-stored copy of a particular cache line corresponding to the cache access request from a state element that is distinct from the data array.

6. The method of claim 5, further comprising the cache circuit performing: in response to determining that the cache access request is sequential, accessing a state element that is distinct from the tag array to retrieve a copy of the tag value previously retrieved from the tag array.

7. A cache circuit, comprising:
   a tag array comprising a plurality of entries indexed by an index field of a memory address, wherein during operation, ones of the entries store respective tag values of a tag field of the memory address;
   a tag comparator that, during operation, compares a tag value retrieved from the tag array with a tag value associated with a cache access to generate a hit signal indicative of whether the cache access results in a cache hit;
   a data array comprising a plurality of lines indexed by the index field of the memory address such that for each line there exists a corresponding entry of the tag array, wherein during operation, ones of the lines store respective data values; and
   a sequential access detector circuit that, during operation, determines whether a first and a second successive cache access are sequential;
   wherein in response to determining that the first and second successive cache accesses are sequential, the sequential access detector circuit causes a particular one of the lines corresponding to the second successive cache access to be retrieved and, during retrieval of the particular line, inhibits access to the tag array without inhibiting the tag comparator, wherein to inhibit access to the tag array, the sequential access detector circuit compares a current word line state with a previous word line state, and in response to determining that the current and previous word line states are identical, inhibits assertion of a word line of the tag array.

8. The cache circuit of claim 7, further comprising a state element coupled to the tag comparator, wherein the state element controllably stores a tag value retrieved from the tag array, wherein in response to the sequential access detector circuit determining that the first and second successive cache accesses are sequential, the tag comparator compares the tag value stored by the state element with a tag value associated with the second successive cache access to generate a cache hit signal indicative of whether the second successive cache access is a cache hit.

9. The cache circuit of claim 7, further comprising a state element that, during operation, controllably stores a copy of a particular line that corresponds to the first successive cache access, wherein in response to determining that the two successive cache accesses are sequential, the sequential access detector circuit causes the copy of the particular line to be retrieved from the state element and, during retrieval of the particular line, inhibits access to the data array.

10. A system, comprising:
    a memory that, during operation, stores instructions; and
    one or more processors that, during operation, execute instructions retrieved from the memory, wherein the one or more processors each comprise:
    an instruction cache comprising a tag array and a data array, wherein the data array comprises a plurality of cache lines, and wherein during operation, the data array stores bundles of instructions retrieved from the memory such that a given one of the cache lines stores multiple bundles of instructions, wherein a given one of the bundles includes multiple instructions;
    an instruction fetch unit that, during operation, causes one or more bundles to be fetched from the instruction cache;
    wherein the instruction fetch unit, during operation, detects that a given fetch request is sequential with respect to a previous fetch request;
    wherein the instruction fetch unit, during operation, further determines that the given fetch request does not cross an instruction cache line boundary relative to the previous fetch request, wherein the instruction fetch unit determines whether the given fetch request does not cross the instruction cache line boundary without comparing an address of the given fetch request with an address of the previous fetch request;
    wherein in response to detecting that the given fetch request is sequential and does not cross an instruction cache line boundary, the instruction fetch unit causes the given bundle to be retrieved from the data array, wherein during an instruction cache access to retrieve the given bundle, access to the tag array is inhibited in a manner that reduces power consumed by the tag array relative to the tag array's active operating state, and wherein during the instruction cache access to retrieve the given bundle, access to the data array is entirely inhibited such that no ways or banks of the data array are accessed.

11. The system of claim 10, wherein the data array includes a plurality of independently-selectable banks arranged such that each of the bundles stored in the given cache line occupies a different one of the banks, and wherein during the instruction cache access to retrieve the given bundle, the instruction cache accesses a given one of the banks corresponding to the given bundle, and access to banks other than the given bank is inhibited.

12. The system of claim 10, wherein in response to detecting that the given fetch request is not sequential or does cross an instruction cache line boundary, the instruction fetch unit causes the given bundle to be retrieved from the data array, wherein during a instruction cache access to retrieve the given bundle, the instruction cache accesses the tag array and performs a tag lookup and compare.

13. The system of claim 10, wherein the given fetch request corresponds to a memory address including an index field, and wherein to determine that the given fetch request does not cross the instruction cache line boundary, the instruction fetch unit during operation determines whether an increment operation to generate the memory address of the given fetch request produced an arithmetic carry into a least significant bit of the index field.

14. A cache circuit, comprising:
    a tag array comprising a plurality of entries indexed by an index field of a memory address, wherein during operation, ones of the entries store respective tag values of a tag field of the memory address;
    a data array comprising a plurality of lines indexed by the index field of the memory address such that for each line there exists a corresponding entry of the tag array, wherein during operation, ones of the lines store respective data values; and
    a sequential access detector circuit that, during operation, determines whether a first and a second successive cache access are sequential;
    wherein in response to receiving the second successive cache access, the tag array retrieves a tag value corresponding to the second successive cache index from one of the entries of the tag array;
    wherein in response to determining that the two successive cache accesses are sequential, the sequential access detector circuit inhibits access to the entire data array during retrieval of the tag value such that no data is read from the entire data array.

15. The cache circuit of claim 14, wherein the first and the second successive cache accesses are associated with respective memory address values each including an index field, and wherein to determine whether the first and the second successive cache access are sequential, the sequential access detector circuit compares values of the index fields respectively associated with the first and second successive cache accesses to determine whether the values are identical.

16. The cache circuit of claim 14, further comprising a state element that, during operation, controllably stores a copy of a particular line that corresponds to the first successive cache access, wherein in response to determining that the two successive cache accesses are sequential, the sequential access detector circuit causes the copy of the particular line to be retrieved from the state element.

17. The cache circuit of claim 16, further comprising a tag comparator that, during operation, compares a tag value retrieved from the tag array with a tag value associated with the second successive cache access to generate a cache hit signal indicative of whether the second successive cache access is a cache hit; wherein in response to determining that the second successive cache access is a cache hit, the tag comparator causes at least a portion of the copy of the particular line retrieved from the state element to be output as cache hit data.

18. The cache circuit system of claim 14, wherein the data array includes a plurality of independently-selectable banks arranged such that different portions of a particular one of the lines are stored in different ones of the banks, wherein the second successive cache access identifies a given portion of the particular line, and wherein in response to receiving the second successive cache access, the cache circuit accesses a given one of the banks corresponding to the given portion of the particular line and inhibits access to banks other than the given bank.

19. The cache circuit of claim 14, wherein data stored by the data array includes one or more of the following: executable instructions, data operated on by executable instructions, or virtual memory address translation information.

\* \* \* \* \*